March 22, 1960 L. R. CLARK 2,929,607
HIGH TEMPERATURE ROTARY PLUG VALVE
Filed Oct. 3, 1958 2 Sheets-Sheet 1
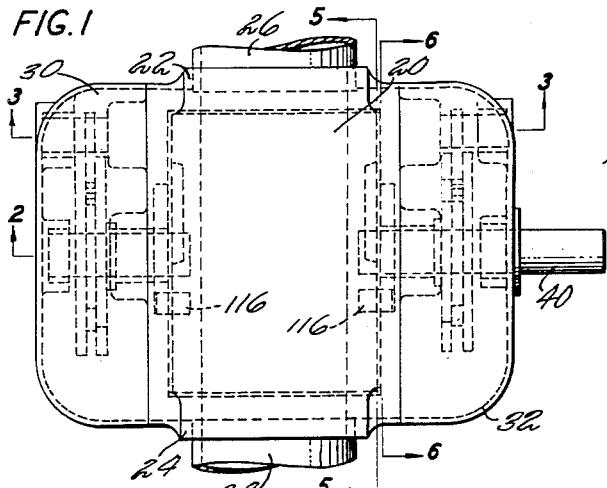
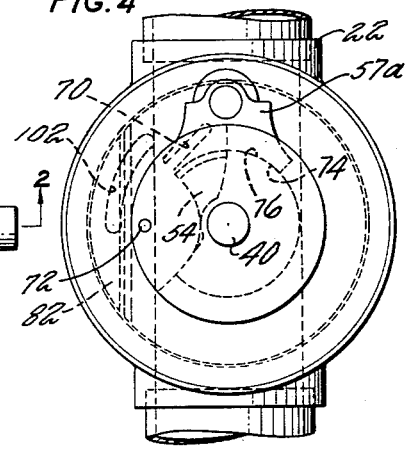
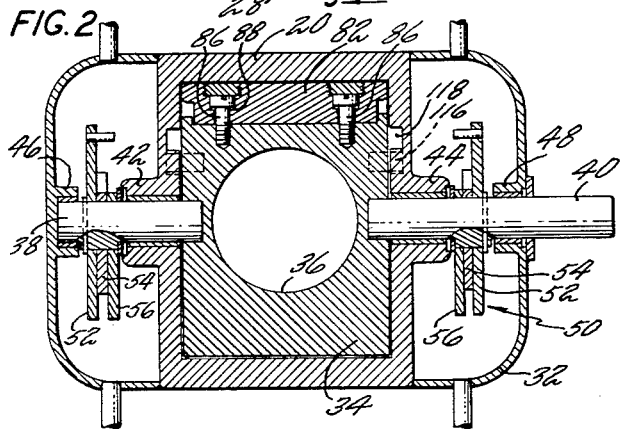
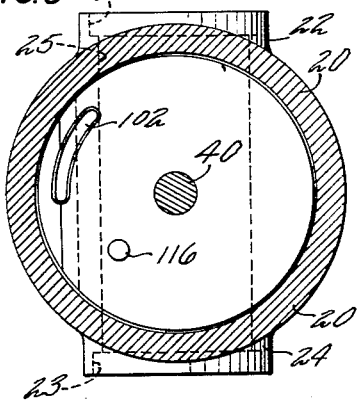
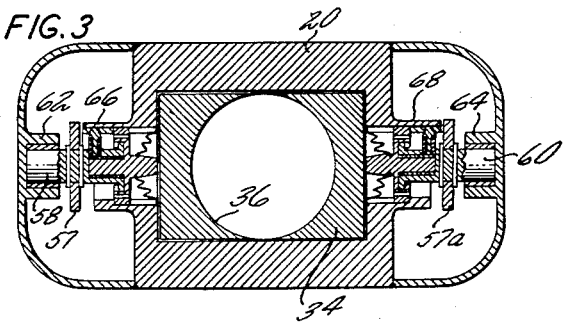
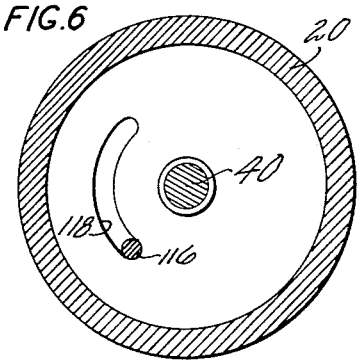
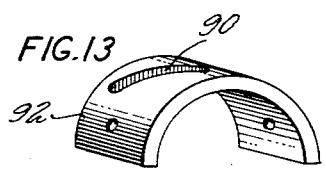
INVENTOR
LEWIS R. CLARK
BY M. B. Tasker
ATTORNEY March 22, 1960 L. R. CLARK 2,929,607
HIGH TEMPERATURE ROTARY PLUG VALVE
Filed Oct. 3, 1958 2 Sheets-Sheet 2
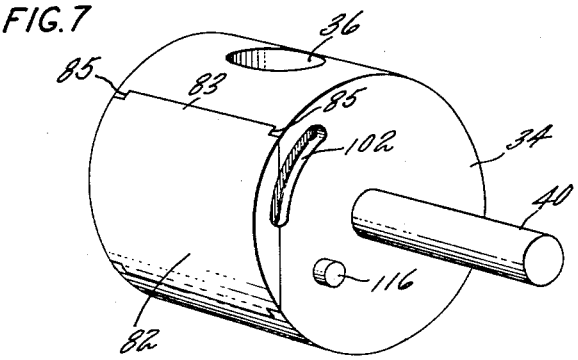
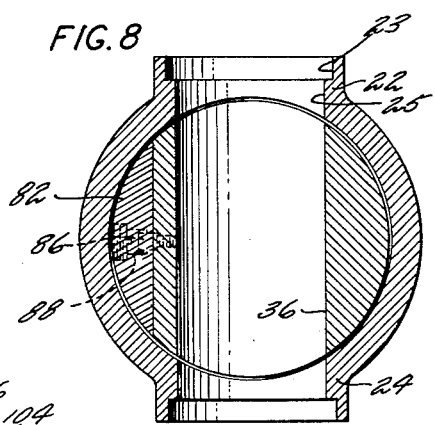
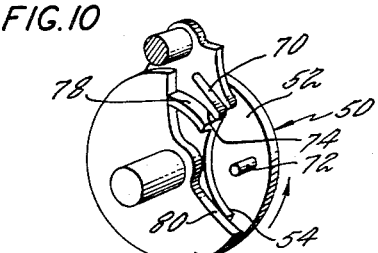
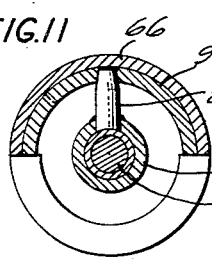
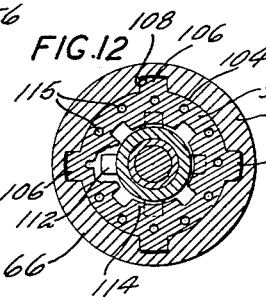
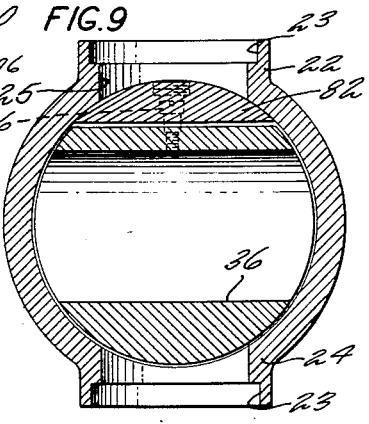
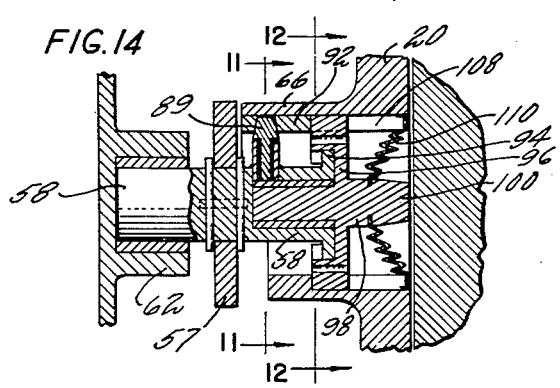
INVENTOR
LEWIS R. CLARK
BY
ATTORNEY

United States Patent Office 2,929,607
Patented Mar. 22, 1960.

2,929,607

HIGH TEMPERATURE ROTARY PLUG VALVE

Lewis R. Clark, Jupiter, Fla., assignor to United Aircraft Corporation, East Hartford, Conn., a corporation of Delaware Application October 3, 1958, Serial No. 765,124

18 Claims. (Cl. 251—192)

This invention relates to valves capable of controlling the flow of liquid metals at temperatures which may be as high as 1700° F. The high temperature and the liquid metal restricts the use of springs, bearings, rotary seals, and prevents the use of long operating bellows such as would be required for a push-pull type of valve.

It is an object of this invention to provide an improved valve and valve operating mechanism therefor having special advantages for use with liquid metals and high temperatures.

Another object of this invention is to provide a two-part movable valve body having a valve face rotatable with the body into a position normal to the direction of fluid flow in which it is then movable relative to the valve body to close the valve.

A further object of this invention is to provide improved valve operating mechanism for producing the above movements of the valve body and the valve face.

A still further object of the invention is to provide a Geneva mechanism for controlling the rotation and subsequent translation of the valve face.

These and other objects and advantages of the invention will be evident or will become apparent from the following description of a preferred embodiment of the invention shown in the accompanying drawings.

In these drawings:

Fig. 1 is a plan view of the valve embodying this invention;

Fig. 2 is a longitudinal sectional view taken along line 2—2 of Fig. 1;

Fig. 3 is a longitudinal sectional view taken along line 3—3 of Fig. 1;

Fig. 4 is an end view of the valve of Fig. 1 with the end cover removed;

Fig. 5 is a sectional view taken along line 5—5 of Fig. 1;

Fig. 6 is a sectional view taken along line 6—6 of Fig. 1;

Fig. 7 is a perspective view of the movable valve member;

Fig. 8 is a transverse sectional view through the valve in the open position of the valve;

Fig. 9 is a similar view showing the closed position of the valve;

Fig. 10 is a perspective view of the Geneva mechanism;

Fig. 11 is a sectional view of line 11—11 of Fig. 14;

Fig. 12 is a sectional view taken on line 12—12 of Fig. 14;

Fig. 13 is a detail perspective view of the cam insert for actuating the valve face of the movable valve member; and Fig. 14 is a view on an enlarged scale of the valve face actuating mechanism in one end of the valve casing.

As herein shown, the valve includes a generally cylindrical central casing 20 having bosses 22 and 24 in its cylindrical side walls to receive inlet and outlet pipes 26 and 28. The bosses are on diametrically opposite sides of the casing so that the inlet and outlet pipes are axially aligned on the diameter of the central casing 20 as shown in Figs. 4 and 5. Bosses 22 and 24 have sockets 23 to receive the ends of pipes 26 and 28 which connect with passages 25. The passages 25 in the bosses are of the same diameter as the internal diameter of the pipes 26 and 28.

Central casing 20 carries opposed cylindrical end housings 30 and 32 which inclose the operating mechanism of the valve.

The movable member of the valve includes a cylindrical valve body 34 (Fig. 7) having a diametrical flow passage 36 which is of the same size as the internal diameter of the pipes 26 and 28 and in the open position of the valve is aligned therewith. Thus, the pipes 26 and 28, passages 25, and the flow passage 36 provide a straight unobstructed passage for the flow of liquid metal or other fluid through the valve. The movable valve body 34 is slightly smaller in diameter than the internal cylindrical cavity of the valve casing 20, so that the movable valve body 34 does not contact the inside wall of the valve casing as it rotates between valve open position shown in Fig. 8, in which the flow passage 36 is aligned with the inlet and outlet pipes 26 and 28, and the valve closed position shown in Fig. 9 in which the flow passage 36 is at right angles to these pipes.

The valve body 34 is mounted by a pair of trunnion shafts 38 and 40. As shown, these shafts are inserted at their inner ends into the valve body 34 and are welded thereto to form a unitary structure. Shafts 38 and 40 are journaled adjacent their inner ends in suitable bushings in bosses 42 and 44 on casing 20. They are also journaled in suitable bushings in bosses 46 and 48 carried by end housings 32 and 30, respectively. Shaft 40 extends through the end wall of housing 32 and forms the operating member for the valve. Geneva operating mechanism generally indicated at 50 is fixed to shafts 38 and 40 within the end housings, as best shown in Fig. 2. These mechanisms are identical and each consists of a Geneva driver plate 52, a Geneva positioning plate 54, and a Geneva positioning and spacer plate 56, all of which are keyed to their respective shafts.

The Genevas 57 and 57a, which are driven by the mechanisms 50, are mounted for rotation on shaft followers 58 and 60. These are journaled in bosses 62 and 64 in the end casings 30 and 32 and are also supported in the larger bosses 66 and 68 in the central casing 20. As shown in Figs. 3 and 14, bosses 62 and 66, for example, in which the shaft follower 58 is mounted are confronting axially aligned bosses between which the shaft follower 58 extends. The Genevas 57 and 57a are keyed to their respective shaft followers 58 and 60 and rotate the shaft followers upon rotation of the Genevas by the Geneva operating mechanisms 50.

Each Geneva has a slot 70 which is entered by a driving pin 72 on the inner face of Geneva driver plate 52, resulting in the rotation of the Geneva and its shaft follower. Prior to the entry of the pin into the slot, an arcuate surface 74 on the Geneva rests on an arcuate surface 76 on the Geneva positioning plate 54 (Fig. 4). The positioning plate 54 also has an inwardly directed arcuate lip 78 (Fig. 10) over which the arcuate surface 74 of the Geneva rides during an inward movement of the latter which will hereinafter be described. The Geneva positioning and spacer plate 56 has a large portion of its periphery cut away at 80 to provide an opening through which the Geneva passes in its inward movement.

In accordance with this invention, the movable valve member is made in two parts. Referring to Fig. 7, it will be noted that the cylindrical valve body 34 has a face portion 82 which is movable relative to the body portion 34 when the valve is in the closed position shown in Fig. 9 to close the passage 25 in boss 22. The face portion 82 is supported on the body portion 34 by means of two studs 86 which are threaded into the valve body 34. The heads of studs 86 are disposed in elongated counterbores 88 in the face portion 82 (Fig. 2), so that the face portion is free for limited movement relative to the heads of the studs in a radial direction. This movement is sufficient to allow the face portion 82 to engage the inner cylindrical bore of the central casing 20 about the entire periphery of the passage 25. Valve face portion 82 has a very small linear travel as limited by the studs 86 and is guided in this movement by the provision of a wide rabbet 83 which provides parallel guide surfaces 85 on the movable valve body 34 and the valve face 82.

The movement of the face portion 82 of the movable valve member is effected by the inward movement of the two Genevas previously referred to, and takes place during the latter part of the rotating movement of the Genevas. Since the mechanism is the same at both ends of the valve only one will be described in detail.

As the Geneva 57 is rotated by the Geneva rotating mechanism 50, it rotates the shaft follower 58 since it is keyed thereto. The shaft follower has fixed thereto a radial pin 89 tapered at its free end. The tapered end projects into a cam slot 90 in the cam insert 92 (Fig. 13).

Cam insert 92 is a semicylindrical arcuate shell which is pinned to the inside of boss 66 on casing 20. As the pin 89 follows along cam slot 90, the shaft follower 58 is cammed inwardly and causes its flanged inner ends 94 to engage flanges 96 of a valve face separator 98 and move the latter inwardly. The valve face separator 98 has a tapered end 100 which moves in a slot 102 in the movable valve body 34. One end of slot 102 extends into the movable valve face 82 so that when the tapered end 100 of the valve face separator 98 is in this end of the slot and is moved inwardly, it cams the valve face outwardly away from the valve body 34. It will be noted that the valve face separator 98 has an outer annular periphery 104 (Fig. 12), which forms a bearing for the valve face separator 98 in boss 66 and that the valve face separator has four peripheral keys 106 which slide in keyways 108 in casing 20. A bellows-type seal 110 is provided between the valve face separator 98 and the valve casing 20 which prevents leakage of liquid metal from the valve casing into the valve separator mechanism.

Referring to Fig. 12, it will also be noted that the flange 94 of the shaft follower is in the form of tabs 112, which normally are located behind flange-like tabs 114 on the valve separator by means of which the valve separator can be withdrawn axially from slot 102 by the action of cam slot 90 and pin 89 as the Geneva is rotated in a valve opening direction. Valve face separator 98 has a plurality of holes 115 about its periphery which permit it to move freely in an axial direction without building up fluid pressure on either side of flange 96.

The shaft 40 moves 90° in moving the valve between open and closed positions, and the limits of opening and closing movements of the valve are determined by pins 116 fixed in the movable valve body 34 and projecting into slots 118 in the adjacent side walls of the casing 20. These cooperating slots and pins are shown most clearly in Figs. 2 and 6.

The operation of the valve is as follows:

Assuming that the valve is in the open position shown in Figs. 1 through 4 and 8, the shaft 40 must be rotated 90° in a clockwise direction, as viewed in Fig. 4, in order to bring the valve face 82 into a position in which it is normal to the through-flow path of the valve and into closing position over the passage 25 as shown in Fig. 9. The two valve face operating mechanisms in end casings 30 and 32 are alike except for their left- and right-hand positions and only the right-hand mechanism will be described in detail although reference may be had to the enlarged view of Fig. 14. During the initial 45° of its closing movement, the arcuate surface 74 of Geneva 57a rides over the arcuate locking surface 76 of the Geneva positioning plate 54 and the valve body 24 moves through 45° of its closing movement. During this movement the valve body 34 moves free from contact with the inner surface of casing 20, a slight clearance being provided between the movable valve body 34 and the adjacent cylindrical wall casing 20 to prevent galling of the surfaces. At the end of 45° of rotation of shaft 40, the locking surfaces 76 of the Geneva positioning plate 54 will have moved out of locking relation to Geneva 57a as pin 72 on the Geneva driver plate 52 enters slot 70 in the Geneva. Further rotation of the shaft 40 in a clockwise direction will cause pin 72 to advance along slot 70, resulting in a counterclockwise rotation of Geneva 57a. During the final 45° of rotation of shaft 40, when the Geneva is rotated counterclockwise by pin 72, it is also moved inward, during which movement the extended lip 78 of the Geneva positioning plate 54 engages surface 74 and guides the Geneva 57a. The Geneva positioning and spacer plate 56, which is likewise keyed to shaft 40 and rotates with plate 54, lies in the plane of lip 78. This plate 56 positions the Geneva 57a when the valve body is rotated from closed to open position.

During the last 45° of valve closing movement, during which the Geneva 57a rotates counterclockwise in Fig. 4, the shaft follower 58 is also rotated counterclockwise with the Geneva since the two are keyed together. As the shaft follower 58 rotates, the pin 89 moves along cam slot 90 of insert 92 imparting an inward movement to the shaft follower. The flanged end 94 of the shaft follower moves the valve face separator 98 inward with it along slots 102 causing tapered end 100 of the valve face separator to be forced between the valve body 34 and the valve face 82. This moves the valve face with a linear motion which is radial with respect to shaft 40. Thus, the rotary motion of the Geneva 57 and its connected shaft follower 58 is converted into linear motion of the valve face separator 98. The linear displacement of the valve face separator 98 relative to the angular displacement of the Geneva 57a is determined by the shape of the cam slot 90. It will be understood that this valve separator mechanism is duplicated on the other side of the valve so that no cramping of the valve face occurs. The extent of the closing movement of the valve is determined by the valve positioning guide pin 116 which has been moving along slot 118 during the above-described 90° movement of the valve operating shaft.

As the valve face separator 98 is moved inwardly between the valve body and the valve face, the latter is forced against the cylindrical inner surface of the valve casing 20 which surrounds the passage 25 through boss 22, as shown in Fig. 9. This translating motion of valve face 82 is permitted by the elongated counterbores 88 in which the heads of the cap screws 86 are received.

In opening the valve, the shaft 40 is turned counterclockwise, as viewed in Fig. 4. The initial clockwise rotation of Geneva 57 is translated into outward linear movement of the valve face separator 98 as the pin 89 moves outwardly in slot 90, since the tabs 112 of flange 94 are behind tabs 114 on valve face separator 98. The Geneva is guided outwardly through the Geneva positioning and spacer plate 56 and over lip 78 of the Geneva positioning plate 54, the Geneva rotating clockwise during this movement until surface 76 on Geneva positioning plate 52 moves under surface 74 of the Geneva which holds the Geneva against rotation during the last 45° of movement of the Geneva actuating mechanism 50.

From the above-described operation of the valve it will be evident that a valve has been provided in which the fluid flow passage through the valve is of uniform diameter, is unobstructed in the open position of the valve, and extends in a straight line through the valve. Also, improved valve operating mechanism has been provided for controlling the movements of a movable valve member between valve open and valve closed positions. It will further be evident that improved means has been provided by which the movable valve member is moved free from engagement with the cooperating housing into a position normal to the flow of fluid through the valve and thereafter in a linear movement into engagement with the valve casing to close the valve.

Further advantages of the improved Geneva actuating mechanism will also be evident by which the rotary movement of the valve operating member is translated into linear movment of the valve face. It will also be noted that the Geneva mechanism has the advantage of locking the valve face operating mechanism when the valve is open and during initial closing movement of the valve body; and that the valve face operating mechanism under the driving action of the Geneva mechanism provides sufficient mechanical advantage to force the valve face firmly against its seat in the closed position of the valve body.

While only one embodiment of the invention has been shown and described herein, it will be understood that various changes in the construction and arrangement of the parts of the valve may be resorted to without departing from the scope of the invention.

I claim:

1. In a valve, a casing having a chamber provided with opposed inlet and outlet openings, a valve body in said chamber having a passage therethrough, said valve body having a valve face movable relative to said valve body, a drive shaft for moving said valve body in said chamber, a shaft follower mounted in said casing for rotation, means including Geneva mechanism for rotating said shaft follower in response to rotation of said drive shaft, a valve face separator associated with said shaft follower, and cam means for reciprocating said valve face separator upon rotation of said shaft follower.

2. In a valve, a casing having a chamber provided with opposed inlet and outlet openings, a valve body in said chamber having a diametrical passage therethrough, said valve body having a valve face movable relative to said body, a drive shaft for moving said valve body in said chamber between positions in which said passage is aligned with and transverse to said openings, a shaft follower mounted for rotation and for axial movement in said casing, means including Geneva mechanism for rotating said shaft follower in response to rotation of said drive shaft, a valve face separator associated with said shaft follower and axially movable therewith, and cam means for reciprocating said valve face separator upon rotation of said shaft follower.

3. In a valve, a casing having a chamber provided with inlet and outlet openings, a valve body in said chamber having a flow passage therethrough, said valve body having a valve face movable relative to said valve body, a drive shaft for moving said valve body in said chamber, a shaft follower mounted in said casing for rotation, means responsive to rotation of said shaft follower for reciprocating the latter, a valve face separator reciprocated by said shaft follower, and means including a Geneva mechanism for operatively connecting said shaft follower and said shaft, said mechanism normally locking said shaft follower against movement and rotating the latter only after said shaft has been moved through a predetermined angle in a valve closing direction.

4. In a valve, a casing having a chamber provided with inlet and outlet openings, a valve body in said chamber having a flow passage therethrough, said valve body having a valve face movable relative to said valve body, a drive shaft for moving said valve body in said chamber, a shaft follower mounted in said casing for rotation, means responsive to rotation of said shaft follower for reciprocating the latter, a valve face separator reciprocated by said shaft follower, and means operatively connecting said shaft follower and said drive shaft for normally locking said shaft follower against movement including a Geneva fixed to said shaft follower and Geneva drive mechanism fixed to said shaft for driving said shaft follower by said drive shaft when the latter has moved through a predetermined angle in a valve closing direction.

5. In a valve, a casing having a chamber provided with inlet and outlet openings, a valve body in said chamber having a flow passage therethrough, said valve body having a valve face movable relative to said valve body, a drive shaft for moving said valve body in said chamber, a shaft follower mounted in said casing for rotation, means responsive to rotation of said shaft follower for reciprocating the latter, a valve face separator reciprocated by said shaft follower, and means operatively connecting said shaft follower and said shaft for rotating said shaft follower in response to rotation of said shaft, said connecting means having provision for normally locking said shaft follower against movement.

6. In a valve, a casing having a chamber provided with opposed inlet and outlet openings, a valve body in said chamber having a passage therethrough, said valve body having a valve face movable relative to said valve body, a drive shaft for rotating said valve body in said chamber between valve open and valve closed positions, a shaft follower journaled in said casing for rotation, a valve face separator, means for operating said valve face separator in response to rotation of said shaft follower, and Geneva mechanism rotated by said shaft for controlling the operation of said shaft follower.

7. In a valve, a casing having a chamber provided with inlet and outlet openings, a valve body in said chamber having a passage therethrough, said valve body having a valve face movable relative to said valve body, a drive shaft journaled in said casing for moving said valve body between valve open position in which said passage is aligned with said openings and valve closed position in which said passage is out of register with said openings, a shaft follower journaled in said casing, a Geneva plate fixed to said shaft follower, Geneva drive mechanism on said drive shaft for normally locking said Geneva plate against rotation and for unlocking and rotating said Geneva plate by said drive shaft as said valve body approaches valve closed position, a valve face separator associated with said shaft follower, fixed cam means, and a cam follower on said shaft follower for converting rotary movement of said shaft follower into axial movement of said valve face separator.

8. A valve comprising a valve casing formed with a chamber and having inlet and outlet openings in communication with said chamber, a valve body in said chamber having a passage for directing the flow of fluid through the valve when said passage is aligned with said inlet and outlet openings, said valve body having a valve face movable relative to said body to close the valve when said face is opposite one of said openings, valve operating means for moving said valve body into a position in which said valve face is opposite said one opening, and mechanism actuated by said valve operating means including a Geneva mechanism for moving said valve face against said opening.

9. A valve comprising a valve casing formed with a chamber and having inlet and outlet openings in communication with said chamber, a rotatable valve body in said chamber having a passage for directing the flow of fluid through the valve when said passage is aligned with said inlet and outlet openings, said valve body having a valve face movable relative to said body to close the valve when said face is opposite one of said openings, valve actuating means for rotating said valve body into a position in which said valve face is opposite said one opening, and mechanism operative during the latter part of said rotating movement of said valve as said valve face is approaching said position in which it is opposite said opening for moving said valve face positively against said opening, said mechanism including a Geneva driven by said valve actuating means.

10. A valve comprising a valve casing formed with a cylindrical chamber and having inlet and outlet openings in the cylindrical side wall thereof in communication with said chamber, a cylindrical valve body in said chamber having a passage permitting the flow of fluid therethrough when said passage is aligned with said inlet and outlet openings, said valve body having a segmental valve face movable relative to said valve body when said face is opposite one of said openings to close said opening, valve actuating means for rotating said movable valve body through a part of a revolution, and mechanism including a Geneva driven by said valve actuating means for effecting translating movement of said segmental valve face against said one opening.

11. A valve comprising a valve casing formed with a cylindrical chamber and having inlet and outlet openings in the cylindrical side wall thereof in communication with said chamber, a cylindrical valve body in said chamber having a passage permitting the flow of fluid therethrough when said passage is aligned with said inlet and outlet openings, said valve body having a segmental valve face movable relative to said valve body when said face is opposite one of said openings to close said opening, valve actuating means for rotating said movable valve body through a part of a revolution, and mechanism operative during the latter part of said rotating movement of said valve body including a Geneva driven by said valve actuating means for effecting translating movement of said segmental valve face against said opening to seal the latter.

12. A valve comprising a valve casing formed with a cylindrical chamber and having inlet and outlet openings in the cylindrical side wall thereof in communication with said chamber, a cylindrical valve body in said chamber having a passage permitting the flow of fluid therethrough when said passage is aligned with said openings, said valve body having a segmental valve face movable relative to said valve body whenever said face is opposite one of said openings to close said opening, an axial shaft rotatable in said casing for moving said valve body through an angle of approximately 90° between valve open and valve closed positions, said valve body being free from contact with the cylindrical walls of said chamber during said movement, a shaft follower mounted in said casing for rotation, a Geneva fixed on said shaft follower for rotating the latter, Geneva driving means fixed on said axial shaft for rotating said Geneva in response to rotation of said axial shaft, and cam means actuated by rotation of said shaft follower for moving said valve face relative to said valve body into valve closing position over said opening.

13. A valve comprising a valve casing formed with a cylindrical chamber and having inlet and outlet openings in the cylindrical side wall thereof in communication with said chamber, a cylindrical valve body in said chamber having a passage permitting the flow of fluid therethrough when said passage is aligned with said openings, said valve body having a segmental valve face movable relative to said valve body whenever said face is opposite one of said openings to close said opening, an axial shaft rotatable in said casing for moving said valve body through an angle of approximately 90° between valve open and valve closed positions, a shaft follower mounted in said casing parallel with said axial shaft, a Geneva fixed on said shaft follower, Geneva driving means fixed on said axial shaft, said Geneva being normally locked against rotation by said driving means, said driving means having provision for unlocking said Geneva and rotating the latter in response to rotation of said drive shaft, and cam means actuated by rotation of said shaft follower for moving said valve face relative to said valve body into and out of valve closing position over said opening.

14. A valve comprising a valve casing formed with a cylindrical chamber and having inlet and outlet openings in the cylindrical side wall thereof in communication with said chamber, a cylindrical valve body in said chamber having a passage permitting the flow of fluid therethrough when said passage is aligned with said openings, said valve body having a segmental valve face movable relative to said valve body whenever said face is opposite one of said openings to close said opening, an axial shaft rotatable in said casing for moving said valve body through an angle of approximately 90° between valve open and valve closed positions, a shaft follower mounted in said casing parallel with said axial shaft, a Geneva fixed on said shaft follower, Geneva driving means on said axial shaft including a Geneva driver plate locking said Geneva against rotation during the first 45° of rotation of said valve body, said driver plate having a driving pin for driving said Geneva during the remainder of the 45° rotation of said valve body, cam follower means carried by said shaft follower, cooperating cam means carried by said casing for moving said shaft follower toward said valve body as said Geneva rotates, and valve face separator means moved by said shaft follower as the latter moves inwardly toward said valve body.

15. A valve comprising a valve casing formed with a cylindrical chamber and having inlet and outlet openings in the cylindrical side wall thereof in communication with said chamber, a cylindrical valve body in said chamber having a passage permitting the flow of fluid therethrough when said passage is aligned with said openings, said valve body having a segmental valve face movable relative to said valve body whenever said face is opposite one of said openings to close said opening, an axial shaft rotatable in said casing for moving said valve body out of contact with said casing through an angle of approximately 90° between valve open and valve closed positions, a shaft follower mounted in said casing for rotation, said shaft follower also being free for axial movement relative to its axis of rotation, a valve face separator operatively connected to said shaft follower for moving said valve face relative to said valve body upon axial movement of said shaft follower, a Geneva fixed on said shaft follower, Geneva driving means fixed on said drive shaft including a Geneva driver plate normally locking said Geneva against rotation, a Geneva positioning plate for guiding the Geneva during its axial movement, cam means carried by said casing, a cam follower carried by said shaft follower, and means for guiding said valve face separator in a straight line toward and away from said valve face as said shaft follower is rotated.

16. A valve comprising a valve casing formed with a cylindrical chamber and having inlet and outlet openings in the cylindrical side wall thereof in communication with said chamber, a cylindrical valve body in said chamber having a passage permitting the flow of fluid therethrough when said passage is aligned with said openings, said valve body having a segmental valve face movable relative to said valve body whenever said face is opposite one of said openings to close said opening, an axial shaft rotatable in said casing for moving said valve body out of contact with said casing through an angle of approximately 90° between valve open and valve closed positions, a shaft follower mounted in said casing for rotation, said shaft follower also being free for axial movement relative to its axis of rotation, a valve face separator operatively connected to said shaft follower for moving said valve face relative to said valve body upon axial movement of said shaft follower, said valve face separator including a tapered plunger, an arcuate slot in said valve body extending into said valve face and into which said valve separator is positively moved upon axial movement of said shaft follower, a Geneva fixed on said shaft follower, Geneva driving means fixed on said drive shaft including a Geneva driving plate normally locking said Geneva against rotation, a Geneva positioning plate for guiding the Geneva during its axial movement, cam means carried by said casing, a cooperating cam follower carried by said shaft follower for moving the latter axially upon rotation of said Geneva, and means for guiding said valve face separator for straight line movement in said casing into and out of said arcuate slot in said valve body as said follower shaft and said valve body are rotated.

17. A valve comprising a valve casing formed with a cylindrical chamber and having inlet and outlet openings in the cylindrical side wall thereof in communication with said chamber, a cylindrical valve body in said chamber having a passage permitting the flow of fluid therethrough when said passage is aligned with said openings, said valve body having a segmental valve face movable relative to said valve body whenever said face is opposite one of said openings to close said opening, an axial shaft rotatable in said casing for moving said valve body out of contact with said casing through an angle of approximately 90° between valve open and valve closed positions, a shaft follower mounted in said casing for rotation, said shaft follower also being free for axial movement relative to its axis of rotation, a valve face separator operatively connected to said shaft follower for moving said valve face relative to said valve body upon axial movement of said shaft follower, said valve face separator including a tapered plunger, an arcuate slot in said valve body extending into said valve face and into which said valve separator is positively moved upon axial movement of said shaft follower and during rotation of said valve body, a Geneva fixed on said shaft follower, Geneva driving means fixed on said drive shaft including a Geneva driving plate normally locking said Geneva against rotation, a slot in said Geneva, a driving pin on said driving plate engageable in said slot to rotate said Geneva after a preliminary rotation of said Geneva driving means during which said Geneva is unlocked, a Geneva positioning plate for guiding the Geneva during its axial movement having an inwardly directed arcuate lip, cam means carried by said casing, a cooperating follower carried by said shaft follower for moving the latter axially upon rotation of said Geneva, means for guiding said valve face separator for straight line movement in said casing into and out of said arcuate slot in said valve body as said valve body rotates between its valve closed and valve open positions.

18. In a valve, a casing having a chamber provided with opposed inlet and outlet openings, a pivoted valve body in said chamber having a passage therethrough, said valve body having a valve face movable relative thereto, a drive shaft for moving said valve body about its pivot between valve open position in which said passage is aligned with said openings and valve closed position in which said passage is transverse to said openings, a shaft follower mounted in said casing for rotation, a valve face separator, means for operating said valve face separator in response to rotation of said shaft follower, and Geneva mechanism rotatable by said drive shaft for controlling the operation of said shaft follower, said Geneva mechanism including a Geneva fixed on said shaft follower and cooperating Geneva driving means fixed on said drive shaft.

References Cited in the file of this patent

UNITED STATES PATENTS

| | | |
|---|---|---|
| 1,803,773 | Schmidt | May 5, 1931 |
| 1,888,000 | Heggem | Nov. 15, 1932 |
| 1,985,449 | Heggem | Dec. 25, 1934 |
| 2,327,425 | Hilker | Aug. 24, 1943 |
| 2,505,998 | Sleeper | May 2, 1950 |
| 2,791,395 | Prescott | May 7, 1957 |